Sept. 5, 1944.   A. LYSHOLM   2,357,338
HYDRAULIC COUPLING
Filed Aug. 7, 1943   2 Sheets-Sheet 1

INVENTOR.
Alf Lysholm
BY
Jarvis C. Marble
his ATTORNEY

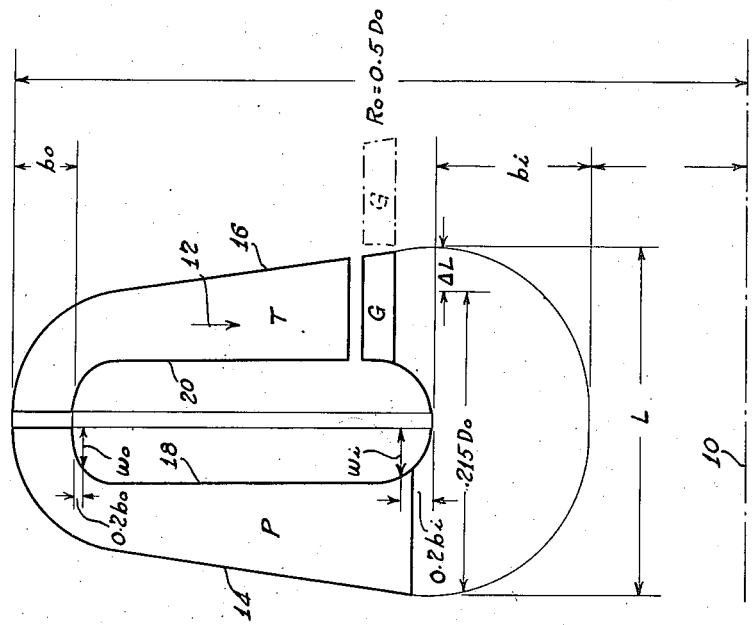
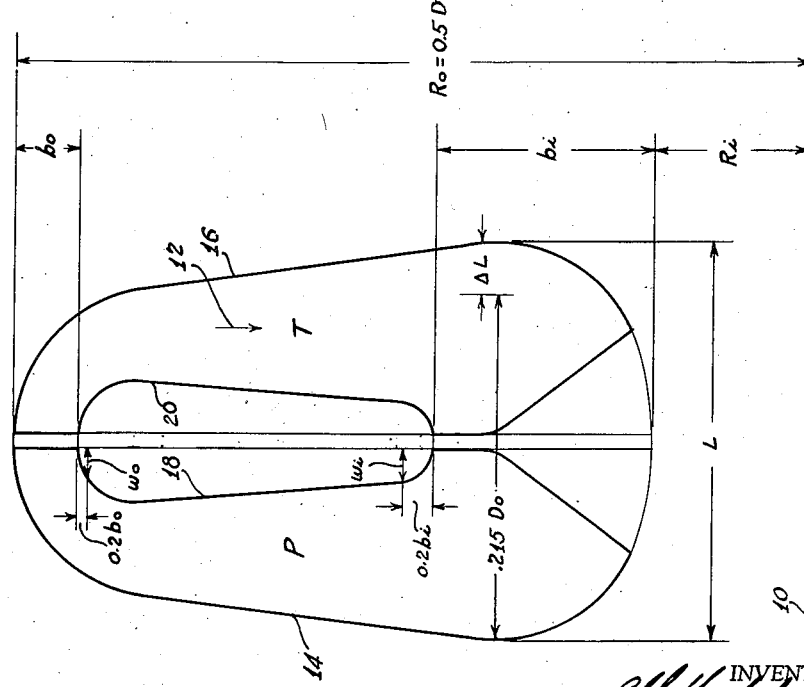

Patented Sept. 5, 1944

2,357,338

UNITED STATES PATENT OFFICE 2,357,338

HYDRAULIC COUPLING

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., trustees Application August 7, 1943, Serial No. 497,748

2 Claims. (Cl. 60—54)

The present invention relates to hydraulic power transmitters of the kind in which torque is transmitted through the medium of a working liquid flowing in a closed path of flow or circuit in which are located bladed driving and driven members, conveniently referred to respectively as primary or pump and secondary or turbine members. The invention is particularly directed to apparatus of the above character operating as a coupling or fluid clutch. Apparatus of known form may provide a coupling which has only primary and secondary members and acts as a coupling at all times or it may provide a device which includes in addition to the primary and secondary members, one or more reaction members which cause the device to operate as a torque increasing converter under certain conditions, such reaction members being rendered ineffective under other conditions automatically or by manual control, either by withdrawal of the reaction members from the circuit or by releasing a releasable brake for holding them, so that the device may also act as a coupling. This latter type of device is usually referred to as a converter-coupling and for the purposes of the present specification the term coupling is intended to refer to both the type of device which is capable of operating only as a coupling and to the type of device which is capable of acting either as a converter or as a coupling, since in so far as the latter type of device is concerned the present invention is concerned only with the operation of the device as a coupling.

It is fundamental with couplings, that is, devices operating with only primary and secondary members effective, that the primary or input torque and the secondary or output torque are always equal, so that any reference herein to torque or torque capacity in discussion such apparatus applies equally to input torque or output torque.

It is further generally characteristic of such couplings that for any given primary speed the torque capacity of the device rises as the percentage of slip, that is, the relative speed between primary and secondary members, rises.

This general characteristic has been recognized as a definite and serious drawback to the use of couplings for what may be termed traction purposes, such as vehicle drives, industrial power takeoffs and the like, which require that the secondary member operate under load at varying speeds. This is particularly the case in those instances where it is desired to use an internal combustion engine as the prime mover, for reasons hereinafter to be more fully explained.

Because of this undesirable characteristic of the basic or original form of the hydraulic coupling as proposed by Föttinger, many different forms of design involving expedients for altering or controlling the nature of the circulatory flow under different conditions of load and speed have been proposed. Such expedients include the use of both fixed and regulable baffles, valves, fixed and regulable partial filling of the working chamber of the coupling and the like, and while some of such expedients have produced couplings more suitable for traction purposes than the original form, they have failed to provide fully satisfactory torque characteristics over the entire range of secondary speed from minimum slip to stall and have, moreover, in most instances, involved increased complication with resultant increase in cost, weight, and size.

It is a general object of the present invention to provide an improved coupling, particularly suitable for traction purposes, in which the drag torque at stall and at high rates of slip is inherently relatively very low while at the same time having high torque transmitting characteristics at low rates of slip. This general object is achieved in accordance with the invention by the provision of a path of flow or circuit of novel character for the working fluid and the provision of blading acted on by the fluid, the nature of which factors, acting together, produces new characteristics of circulatory flow which in turn produce the desired improved torque transmitting characteristics of the coupling. Thus in accordance with this invention, the improved characteristics are obtained without resorting to emptying and filling arrangements, control valves in the working circuit, or any other auxiliary apparatus productive of complication of or addition to the simple fundamental structure of fixed bladed driving and driven members cooperating in a common circuit.

For a better understanding of the manner in which the general and more specific objects of the invention are attained, reference may best be had to the following portion of this specification, taken in conjunction with the accompanying drawings in which:

Fig. 3 is a diagrammatic representation of a half section of a hydraulic coupling circuit; and Fig. 4 is a view similar to Fig. 3 of a coupling circuit including a reaction element selectively usable to permit operation of the device at times as a converter.

Figure 1:
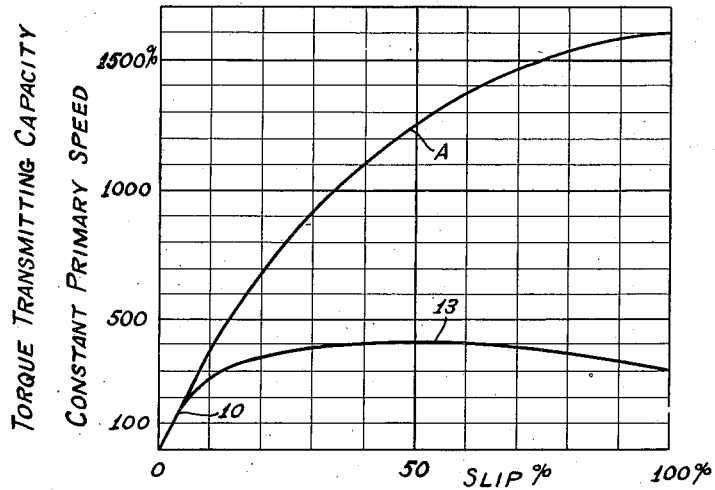
Fig. 1 is a diagram in which the torque transmitting capacity of the coupling at constant primary or input speed is plotted against percent slip.

Referring now more particularly to the diagram of Fig. 1, in which torque transmitted by the coupling at any given constant primary or input speed is plotted as ordinate against slip as abscissa, the curve A represents the torque transmitting characteristics of a coupling of basic and more or less standardized Föttinger construction in so far as character of working circuit and blading are concerned and with which the art is familiar. For convenience such a coupling will hereinafter be referred to as a standard coupling.

It is fundamental with couplings of the kind under consideration that the torque transmitting capacity is zero for zero slip and therefore some slip must occur in normal operation. Because such slip represents power loss (increase of torque by the coupling to compensate for slip being impossible) couplings are ordinarily designed to transmit the full torque of the prime mover with a relatively small percentage of slip, amounting to five percent or less. Since slip represents nothing but power loss, the minimum possible slip under normal operating conditions is highly desirable and where stalling conditions need not be provided for, a slip of as little as two percent is practical. However, for traction coupling purposes, where stalling may occur, such a small percentage of normal slip is not practical with a standard coupling for reasons to be hereinafter pointed out.

If, now, we assume for the moment that a standard coupling having the characteristics of curve A is used as a traction coupling or power takeoff for an internal combustion engine, the unsuitability of its characteristics for this kind of work is readily demonstrable. Let it further be assumed that the coupling is designed to transmit the maximum torque of the engine with 2.5% slip, this being represented by point 10 on curve A. Now further suppose that the driven or secondary coupling member is connected to a vehicle drive or an industrial load of highly variable value. If the torque required to move the load exceeds the value represented by point 10, then the slip must necessarily increase and with the increase in slip the torque load on the engine increases. This slows down the engine and reduces the torque transmitting capacity of the coupling, such capacity varying with the square of the primary speed. However, with a standard coupling the torque transmitting capacity at a given primary speed with the secondary member stalled is many times the capacity at normal operating or minimum slip, the ratio between stall and a normal working slip of 2.5% being as much as 16 to 1. If such a ratio is taken as an example, then a secondary load sufficient to stall the driven member of the coupling will slow down the engine to 25% of its normal operating speed, since this amount of primary speed reduction is necessary to reduce the torque transmitting capacity of the coupling to a value corresponding to the torque which the engine can produce. Many engines will stall before slowing down under full throttle to a quarter of their normal speed and even if they do not stall, their operation at low speeds with full throttle is highly unsatisfactory. Furthermore, under the conditions above outlined, there would be the additional highly undesirable condition of the engine having to operate at full throttle in order to maintain even one quarter normal speed against a stalled secondary member, which would mean that even at this low speed the drag torque on the secondary member would be the full torque which the engine is capable of developing at quarter speed. This would be much too high for idle periods. For idle periods of operation, when it is desirable to keep the engine running without doing useful work, the torque transmitted through a standard coupling would still be too great even if the engine could be throttled to one eighth normal speed, since to maintain even as low a speed as this against a stalled secondary member the throttle would have to be adjusted so that the engine would develop at least a quarter of the torque developed at full throttle and at quarter normal speed.

With a standard coupling the above discussed difficulties can be alleviated to some extent by proportioning the size of the coupling to that of the engine with which it is used, so that its normal minimum slip is of the order of five percent. This results in a materially lower ratio between torque transmitting capacity at stall and at normal minimum slip. Consequently the engine speed is not decreased at stall to a degree making engine operation at stall impractical. Improvement of operation at stall by this expedient is, however, not satisfactory, since it is obtained at the expense of unduly high slip over the entire working range of the coupling. In other words, it is a bad compromise.

On the other hand, if a coupling is provided having a characteristic torque transmitting curve such as shown at B, all of the deficiencies of operation noted above can be substantially eliminated. As will be observed from this curve, the torque transmitting capacity at constant primary speed rises with increase in slip from zero value, but only to a limited extent, and, after the slip has exceeded a certain intermediate value, actually decreases with further increase in slip. The curve shown illustrates a characteristic for which the torque capacity at stall of the secondary member is about three times that at normal working slip (2-3%) and for which the maximum torque transmitting capacity at the given primary speed is only about four times that at the normal working slip.

If we now consider the effect on engine operation of a coupling having this characteristic and used for traction purposes, we find that as in the case previously discussed, if the secondary torque increases due to overload, the engine is slowed down. However, in the present instance, due to the fact that the maximum torque transmitting capacity of the converter at normal primary speed is only four times its capacity at normal slip, the engine can at the most be pulled down to half speed by the coupling as the slip of the latter increases. At that engine speed the torque capacity of a coupling having the characteristic under discussion will have been lowered to the torque the engine will develop at the lower speed. Furthermore, if due to continued overload, the slip is increased beyond the value represented by the peak of curve B (which occurs in the region of 50% slip) the torque capacity of the coupling falls off and if the engine throttle is kept fully open the engine will increase its speed as the slip increases to 100%. Consequently, the operating result with such a coupling is that if overload is encountered when running normally, the engine will (assuming continued full throttle operation) first slow down to approximately half speed and then speed up as the slip passes the critical value. With this character of operation, danger of stalling the engine is eliminated and if the overload stalls or nearly stalls the secondary member so as to cause a very high percentage of slip, the engine can continue to deliver a substantial percentage of its maximum power toward overcoming the overload, since the engine will operate at a speed in excess of half speed. If the torque capacity characteristic is as shown by curve B, the full throttle engine speed with the secondary member stalled will be of the order of 60%-65% of normal speed, and at this speed satisfactory full throttle operation is obtainable, as is also substantially maximum engine torque since the torque curve for most internal combustion engines is substantially flat over the normal working range and for the purposes of this discussion may be considered to be constant.

From the standpoint of the torque transmitted to the secondary member under idling conditions, it will be remembered that in the case of a standard coupling having the characteristics of curve A, full throttle is required to maintain even quarter normal engine speed against a stalled secondary member. In the case of a coupling having the characteristics of curve B, however, which will enable the engine to run with full throttle at 60-65% normal speed against a stalled secondary, only about 18% of normal full torque is required to be developed to enable the engine to turn at quarter speed against a stalled secondary. If in this latter case the engine is of a flexible type, such as a conventional automobile engine, capable of being operated at one eighth normal speed, it can run at this speed against a stalled secondary while developing only some four or five percent of its normal full torque. Therefore, with a coupling having the characteristic of curve B, it is possible to idle the engine at low speed with very little torque input to the coupling and consequently very little drag torque applied to the secondary member. This is, of course, a highly desirable condition to obtain in many types of installations where the load not only varies but is intermittent in nature.

Figure 2:
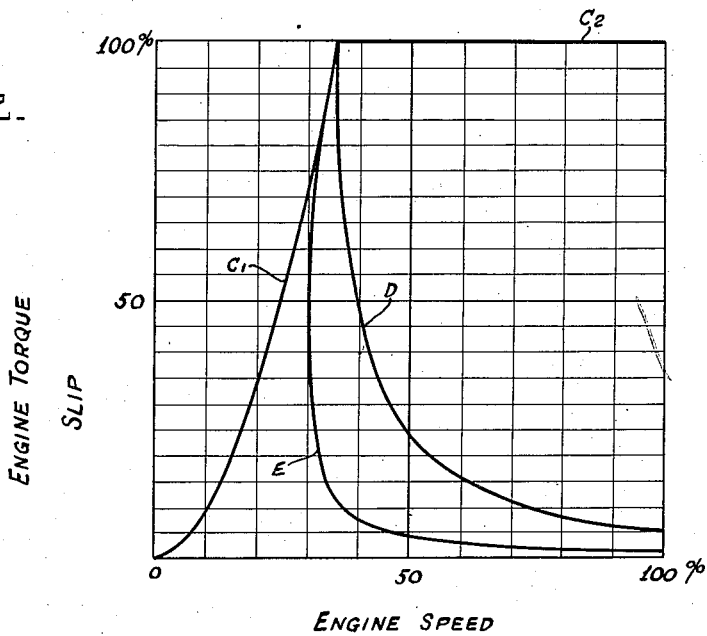
Fig. 2 is a diagram in which engine and coupling torques are plotted against engine speed.

Referring now to Fig. 2, the diagram of this figure illustrates more clearly the very greatly differing performance characteristics obtainable from a power unit equipped with couplings having the general torque characteristics of curves A and B, respectively, of Fig. 1. In the present diagram, engine speed is plotted as abscissa, and percent coupling slip and engine torque are plotted as ordinates. For purposes of illustration the engine torque is represented by the curve $C_1C_2$, showing a rise to 100% torque at 35% of full engine speed with full throttle and constant torque at full throttle for the speed range above 35%.

The portion $C_2$ of the curve roughly approximates the full throttle torque characteristic of many internal combustion engines, which have a substantially flat torque curve down to about 35% engine speed, and the portion $C_1$ of the curve represents torque at part throttle operation of the engine below the speed at which satisfactory full throttle operation is ordinarily obtainable with many such engines.

Curve D represents the slip of a standard coupling having a torque characteristic of the general nature of curve A of Fig. 1, the size of the coupling in relation to the engine being such that at full speed full load operation the slip is 5%. With such a coupling, if a secondary torque sufficient to cause 100% slip is encountered, the coupling will cause the engine speed to drop to 35% at full throttle, as previously explained in connection with curve A of Fig. 1, which is highly undesirable. Moreover, with such a coupling, an undesirably high rate of slip is engendered throughout the working full load speed range of the engine. This will be apparent from inspection of curve D, which shows a slip of 10% under load conditions which pull the engine down to three quarter speed and a slip of 25% at half engine speed. For a vehicle or power takeoff drive these values are definitely unsatisfactory, since in such applications loads are frequently encountered which the engine cannot handle at full speed, and at the resulting lowered engine speed the high rates of slip represent not only excessive power loss but also introduce major difficulties because of the heat generated in the coupling, since the lost power is all converted into heat.

On the other hand, a power unit having a coupling with the torque characteristic of curve B of Fig. 1, has an operating characteristic represented by curve E of Fig. 2. With such a coupling, the size of the coupling for a given engine may be made such that the full load full speed operation is accompanied by as little as 2% slip or even less, which is obviously a distinct advantage. Also, due to the torque characteristic of the coupling, the slip of the coupling increases only very little as the full load engine speed decreases under overload. As will be seen from curve E the slip at 50% engine speed and full load will only be of the order of about 5%.

Due to the facts that the increase in torque transmitting capacity with increasing slip of a coupling having the characteristic of curve B of Fig. 1 is relatively limited even when primary speed is maintained constant and that the torque transmitting capacity of any coupling varies with the square of the primary speed, the torque transmitting capacity of the coupling under consideration will not increase materially if the overload is increased so as to further reduce the primary speed to some value below 50% full speed. Instead, the slip will increase relatively rapidly as the primary speed falls below 50%, finally reaching a condition where the coupling in effect "breaks" to 100% slip, without imposing a commensurately greater torque load on the engine, and in fact imposing even less load than at say 50% slip.

In the diagram of Fig. 2, the curves D and E serve to compare the slip characteristics of two couplings, both of which if sufficiently overloaded are capable of pulling the engine speed at full throttle down to 35% of normal at 100% slip or stall. Starting with this assumption, namely, the same torque transmitting capacity at stall, it is evident that the advantage of the coupling having characteristic E over that having characteristic D lies in the very much less slip of the former as compared with the latter, throughout the normal working range. It will be equally clear that in so far as the idling range is concerned the drag torques of the two couplings will be alike, since both will require at stall the full throttle power of the engine to attain 35% of full engine speed.

If very low drag torque at stall is a primary factor, as in an automobile drive, and the absolute minimum of slip at full speed operation is not required, a coupling having the characteristic E can satisfactorily fulfill the requirement. This can be done by reducing the size of the coupling so that with full throttle at stall say 50% of full engine speed is attained. With such a coupling, an idling speed of a flexible engine, say 10% to 15% of full speed, will produce so little drag torque as to substantially eliminate any tendency of the vehicle to "creep" when stopped with the engine running. The reason that this is feasible is that the very flat low slip characteristic of curve E in the normal range permits this curve to in effect be displaced to the right in Fig. 2 to obtain lower drag torque in the idling range, without materially increasing the percentage of slip in the working range. On the other hand, the nature of curve D is such that even with a coupling designed to place the curve as shown in Fig. 2, the slip at full speed operation is higher than desirable. If the size of the coupling is reduced to shift the position of curve D to the right, in order to obtain better drag torque characteristics at idling, then the slip throughout the normal working range becomes too high to provide an acceptably efficient drive. Curve D cannot be shifted to the left in order to get better slip characteristics in the working range because to do that would result in reducing below an acceptable value the speed to which full throttle engine operation would be reduced at stall. Thus it is apparent that with a coupling having a characteristic curve D, which is typical of a standard coupling, the best that is attainable is a bad compromise, with relatively high slip in the working range and substantial drag torque in the idling range.

It has been recognized that the radial extent of the circuit at the radially outer part (indicated at $b_0$ in Fig. 3), which is usually the place at which the liquid passes from the blades P of the primary member to the blades T of the secondary member, is an important factor in determining the performance characteristics of a coupling. It has, however, heretofore been believed that reduction in the value of this dimension would operate to decrease the capacity of the coupling, since it was thought that a small area for flow of the working liquid at this point would operate as a restriction or throttle acting to decrease the quantity of liquid circulated per unit time. It was further thought that this throttling effect would influence the performance in the same way, that is, reduce the rate of circulation, throughout the operating range of the coupling. In other words, it was thought that a relatively small flow area at the outer radius of the circuit would operate to reduce capacity at normal slip, at stall and throughout the range between normal slip and stall.

This general concept I have found, however, to be not the case and I have further discovered that provided other considerations hereinafter to be discussed are taken into account, the radial extent of the circuit at the outer radius can be made very small without having the effect of generally reducing the capacity of the coupling and in fact may be employed to very greatly improve its operating character by acting with great effectiveness as a throttle to reduce capacity when the rate of slip is high while not producing a throttling effect when the rate of slip is low, and in fact, under the latter condition actually resulting in a slightly increased rate of flow with resultant increase of capacity, as compared with a larger dimension at this place in the circuit.

For various reasons others have heretofore suggested forms of couplings in which the radial extent of the circuit at the outer radius is relatively small in relation to the coupling diameter, as compared with conventional designs. As far as I am aware, however, all such couplings heretofore proposed have not been able to obtain the desired operating characteristics which are attained by the present invention, owing to the fact that the required relations between this dimension and other critically important factors in the design have not been appreciated.

A small radial extent at the outer radius of the circuit will not alone achieve the desired results. I have found that in addition to this factor the relation of the overall axial extent of the circuit to its outer diameter must be taken into consideration. A further limiting factor is the relation of the inner diameter of the torus ring or core to the outer diameter of the core. Still another factor which must be taken into account is the number of the vanes or blades employed, and to a certain extent the thickness of the vanes must be taken into account since the number and thickness of the vanes is determinative not only of the total area for flow of liquid but also of the width peripherally of the individual channels. I have found among other things that such width of individual channels has an important influence on the capacity of the coupling and that if such channels are too wide peripherally the capacity of a coupling of given diameter is decreased to an extent which may substantially eliminate the advantage to be obtained by utilizing a relatively small channel at the radially outer portion.

Not only is the radial extent of the channel at the radially outer part of the circuit an important factor but the radial extent of the channel at the radially inner part (indicated at $b_1$, in Fig. 3) is also an important factor and this latter factor is taken into account by the proper proportioning of the inner and outer radii of the torus ring or core as previously mentioned. In connection with the radial extent of the channel at the radially inner and outer parts it is important to note that the factor to be taken into account is the "effective" radial extent of the circuit at these places. The effective extent of the channel may not coincide with the physical extent between the walls defining the circuit at these places, since if the torus ring or core is not rounded but is made with a very short radius or sharp corner at the place where flow changes from generally radial direction to generally axial direction there will result a contraction in the column of flowing liquid after it passes such sharp corner or radius, so that the effective extent of the passage becomes the transverse extent of the contracted column of flowing liquid. Consequently since the effective radial extent of the circuit at the radial inner and outer parts of the circuit are both important factors, the shape of the torus or core ring must also be taken into consideration. Still another factor which must be taken into account is the outlet angle of the pump blades. I have not only discovered that all of the above factors must be taken into consideration in order to achieve the desired object but have further succeeded in rationalizing these factors so that for any given desired design these factors may with certainty be so related to each other that the desired torque transmitting characteristics can be obtained for a given coupling.

From the foregoing discussion it will be evident that the problem with which the present invention is concerned is to provide a coupling the characteristics of which are of the nature represented by curve B of Fig. 1 and curve E of Fig. 2, and I will now proceed to explain how in accordance with the present invention this may be accomplished with a simple constantly filled type of coupling, not complicated by auxiliary control devices such as throttling valves or the like.

Referring now to Fig. 3 there is shown diagrammatically a transverse half section of the flow circuit of a coupling which may be dimensioned as hereinafter explained to embody the principles of the present invention. Details of mechanical structure and design have been omitted for the sake of clearness since the details of mechanical structure may be in accordance with any of the well known types of design and are unnecessary to an understanding of this invention. In this figure the axis of rotation of the coupling members is indicated at 10 and the primary or pump member is indicated as having blades P. The turbine or secondary member has blades T and the direction of flow of the working liquid in the circuit as is shown by arrow 12.

The outer wall of the working circuit is provided by the wall 14 of the primary member and wall 16 of the secondary member. The usual core or torus ring is provided by the axially inner wall portions 18 and 20 of the primary and secondary members respectively.

This rationalizing, which takes into account the relation of the overall axial extent L of the circuit to the outer diameter of the circuit, the relation to the outer diameter of the circuit and to each other of the radial extents of the circuit at the radially outermost and innermost parts thereof, the number and thickness of the blades employed and the outlet angle of the pump blades, and the extent and degree of rounding or sharpness of the corner portions of the torus ring or core, is best expressed by the terms of a mathematical formula in which, if the several dimensional and other factors taken into account are substituted, an arbitrary coefficient will be obtained, which coefficient, if falling within a certain range of values, will show that the coupling according to the given design embodies the principles of this invention and will have the desired torque transmitting characteristics.

This formula is not valid for couplings of all proportions and is to be used only for designs in which the radius of the innermost part of the hydraulic circuit ($R_i$) is less than one-half the maximum or outer diameter ($R_o$) of the circuit. The formula is as follows:

$$K = \frac{21.5}{21.5 + \Delta L} \left[ 1 - \left( \frac{R_i + b_i \left( 0.8 + \frac{w_i}{b_i} \right)}{R_o - b_o \left( 0.8 + \frac{w_o}{b_o} \right)} \right)^2 \right]$$

$$\frac{\sqrt{\frac{1}{\sin \alpha} \left( \frac{90 Z}{f} - 12 \right)}}{b_o \left( 0.8 + \frac{w_o}{b_o} \right)}$$

The above formula is most easily applied and made use of when the various dimensional factors are reduced to terms of percentage of the outer diameter $R_o$ of the circuit and will be discussed herein on the basis of such percentages, in so far as dimensional factors are involved.

In applying the various factors in the formula the term $\Delta L$ is that part of the maximum overall axial extent L of the circuit which is in excess of 21.5% of the outer diameter $D_o$. If the coupling design is for a relatively narrow coupling, considered axially, the factor $\Delta L$ may drop out of the equation since the overall axial extent L may be no greater or even less than 21.5% of $D_o$. In the latter event, the first factor of the right side of the equation becomes one.

In the second factor of the equation, the values inserted for $R_i$ and $R_o$ respectively are the percentages of $D_o$ which these dimensions represent. This applies also to the factors $b_i$ and $b_o$.

The factors $w_i$ and $w_o$ are in effect correction factors for correcting, if necessary, for the difference, if any, between the actual and effective transverse extents of the flow circuit due to relatively sharp corners of the torus ring. The actual dimension of $w_o$ for example, is obtained by measurement of the axial extent of the torus ring portion of one of the members at a distance radially inwardly from the outermost portion of the torus ring equal to two-tenths of the radial extent of the circuit at its radially outermost part, or in other words, at a distance equal to $0.2b_o$. Likewise, the actual dimension of $w_i$ is obtained by measurement of the axial extent of the torus ring portion of one of the members at a distance radially outwardly from the innermost portion of the torus ring equal to $0.2b_i$.

The torus ring portions of the primary and secondary members in some designs may not be alike. In such cases, the corners at the inner and outer parts of the torus ring which respectively have the smallest radius of curvature or the greatest sharpness are controlling, and in cases where the curvatures are not the same on the two members, the values of both $w_o$ and $w_i$ should be calculated for both members and the smallest value for each of these factors utilized in the equation. As before noted, however, the factors $w_i$ and $w_o$ are both correction factors for taking into account the difference between actual and "effective" dimensions of the flow circuit produced by a torus ring having one or more relatively sharp corners, and therefore if the corners have relatively large radii of curvature, these correction factors are not required and should the actual dimension of either $w_i$ or $w_o$ be greater than $0.2b_i$ or $0.2b_o$ respectively, the value to be assigned to $w_i$ or $w_o$, as the case may be, is arbitrarily taken as $0.2b_i$ or $0.2b_o$ respectively.

For the third factor of the equation, the sine of the outlet angle of the pump blades is used for the value sine $\alpha$ and as will be observed this factor becomes one if the discharge from the pump blades is radial so that the sine of the outlet angle is unity.

In many instances, the pump and turbine members will not have equal numbers of blades. In all such instances the value to be used for the factor Z in the equation is the number of blades in that one of the members having the least number of blades, which is controlling.

In so far as the flow area peripherally of the circuit is concerned, the critical factor is the percentage of free flow area at the radially outermost part of the bladed portion of that one of the members in which the number and thickness of the blades results in the smallest value of such free flow area, in those cases where the two members are different in this respect. The value to be used for $f$ in the above equation is thus arrived at by determining the summation of the thickness of all of the blades of the critical member on the circumference of the outer ends of the blades and then determining from the relation of the summation of their thickness to the circumference of the circle on which measurement is taken, the percentage of free flow area.

After having determined by measurement and calculation the values from a given coupling design to be used in the equation, the equation is then solved for the value of the coefficient K. If the value of K as thus determined is equal to or greater than 0.55 the coupling will operate with a torque transmitting characteristic of the kind desired to be obtained by this invention, namely a torque characteristic at constant input speed which gives increasing torque transmitting capacity as slip increases from normal minimum slip to a higher value at an intermediate percentage of slip, and then falls off as the slip increases toward stall.

If the value of K as determined from a given design proves to be less than 0.55 the desired torque transmitting characteristic will not be obtained from that design, which, if the desired results are to be obtained, must be modified in one or more particulars so as to provide dimensions which will give a value to the coefficient K that is within the desired range.

The relation between dimensions such as outer diameter and overall axial length may vary considerably depending upon space or other limitations governing the installation of any particular coupling. The principles of the present invention are, however, not limited to any particular overall dimensional relation other than the one that the inner radius of the hydraulic circuit shall be less than one-half the outer radius of the circuit. Except for this limitation the overall proportions of the coupling may be varied, the numbers and exact configurations of the blading may be varied, the numbers of blades in the two different members of the coupling may be made the same or different and the sections of the torus ring portion of the two members may be the same or different, while at the same time obtaining the desired torque transmitting characteristics by so relating all of the variables herein above discussed so that when equated in accordance with the formula given, the coefficient K will be of a value within the desired critical range.

In order most readily to achieve the desired results within the scope of this invention it is also usually desirable to lay out the coupling design with a certain minimum ratio between the outer and inner radii of the torus ring or core and to this end it is preferable that the relation between these radii be such that the factor $$K_1 = \frac{R_i + b_i\left(0.8 + \frac{w_i}{b_i}\right)}{R_o - b_o\left(0.8 + \frac{w_o}{b_o}\right)}$$

in the previously discussed equation provides a value for the coefficient $K_1$ equal to or less than 0.7.

As previously noted, the invention is applicable to power transmitters which are capable, under certain conditions of operation, of operating as converters and by way of illustration there is shown in Fig. 4 the outline of the circuit of such a device in which in addition to the pump and turbine blades P and T respectively, a member carrying guide blades G is also provided in the circuit, these guide blades being capable of being rendered inoperative either by being mounted on a wheel which can be moved axially to withdraw the blades from the circuit or which is held stationary by a coupling which can be released to permit the guide blades to float freely in the circuit, leaving only the pump and turbine members to act effectively and thus produce coupling operation. In this figure the various factors applicable to the formula have been indicated and by comparison of Figs. 3 and 4 it will be evident that the principles of the invention are applied in exactly the same way in both cases, the presence of the third element making no difference since the characteristics with which the present invention is concerned are only those which occur when the device operates as a two-element coupling.

What is claimed is:

1. A hydraulic coupling of the closed circuit type having bladed primary and secondary members through which the working liquid is circulated in a circuit encircling a torus or core ring, said circuit being characterized by the fact that the radial extent of the circuit relative to the outer diameter of the circuit at the radially outermost and radially innermost portions of the circuit, the number of blades in the member having the least number of blades, the radii of curvature of the radially inner and outer portions of said torus ring or core, the outlet angle of the blades of the primary member, the percentage of free area for flow of liquid at the outer part of the bladed portion of that member having the least flow area at that part and the maximum overall axial dimension of the circuit in relation to the outer diameter of the circuit are so related that the inner radius of the hydraulic circuit is less than one-half the outer radius of the circuit and that the value of the coefficient K is equal to or greater than 0.55 in accordance with the formula:

$$K = \frac{21.5}{21.5 + \Delta L}\left[1 - \left(\frac{R_i + b_i\left(0.8 + \frac{w_i}{b_i}\right)}{R_o - b_o\left(0.8 + \frac{w_o}{b_o}\right)}\right)^2\right]$$

$$\frac{\sqrt{\frac{1}{\sin \alpha}\left(\frac{90\,Z}{f} - 12\right)}}{b_o\left(0.8 + \frac{w_o}{b_o}\right)}$$

and in which formula the several variables, of which the dimensional variables are expressed in percent of the outer diameter of the circuit, are as follows:

$R_i$ is the radius of the innermost part of the circuit;

$R_o$ is the radius of the outermost part of the circuit;

$b_i$ is the minimum radial dimension of the radially innermost section of the circuit;

$b_o$ is the minimum radial dimension of the radially outermost section of the circuit;

$\Delta L$ is that portion of the maximum overall axial dimension of the circuit in excess of 21.5% of the outer diameter of the circuit, if there be such excess;

$w_i$ is the axial dimension of the torus portion measured at a distance $0.2b_i$ radially outwardly from the radially innermost part of the torus portion of that one of the members giving the lesser value of $w_i$ but having an arbitrarily assigned maximum value of $0.2b_i$ should the measured dimension exceed $0.2b_i$;

$w_o$ is the axial dimension of the torus portion measured at a distance $0.2b_o$ radially inwardly from the radially outermost part of the torus portion of that one of the members giving the lesser value of $w_o$ but having an arbitrarily assigned maximum value of $0.2b_o$ should the measured dimension exceed $0.2b_o$;

$Z$ is the number of blades in the primary member or the secondary member, whichever has the least number of blades;

$f$ is the free flow area, expressed in percentage of the circumference at the outermost part of the bladed area of the primary member or the secondary member whichever has the smaller percentage of free flow area at the outermost part of its bladed portion;

$\alpha$ is the outlet angle of the blades of the primary member.

2. A coupling as set forth in claim 1 in which the torus ring ratio $K_1$ has a value equal to or less than 0.7, in accordance with the following formula;

$$K_1 = \frac{R_i + b_i\left(0.8 + \frac{w_i}{b_i}\right)}{R_o - b_o\left(0.8 + \frac{w_o}{b_o}\right)}$$

ALF LYSHOLM.